3,309,885
ABSORPTION REFRIGERATION

Thomas W. Phillips, Orange, Kevin P. Murphy, Bernardsville, and Richard F. Sweeney, Randolph Township, Morris County, N.J., assignors to Allied Chemical Corporation, New York, N.Y., a corporation of New York
No Drawing. Filed Feb. 4, 1966, Ser. No. 525,141
9 Claims. (Cl. 62—112)

This invention relates to the provision of a novel class of working fluids for absorption refrigeration systems.

In absorption refrigeration systems, like conventional compression refrigeration systems, a refrigerant liquid is vaporized in an evaporator, takes in heat at low temperature, is compressed to a pressure such that it condenses at a higher temperature in the condenser and then is returned to the evaporator for recycling. The difference in the two systems lies in the means for effecting compression of the refrigerant vapor. In a conventional compression refrigeration system, this is accomplished by a mechanical compressor. In an absorption refrigeration system, this is accomplished by contacting the refrigerant vapor with a medium which absorbs or otherwise ties up the refrigerant vapor so that the refrigerant can be rereturned to the high (pressure) side without the need for expending a large amount of mechanical work to compress the vapor. At the high side, the absorbed refrigerant is released by decomposing with heat, following which the absorbing medium is returned to the absorber for reuse and the refrigerant is condensed and returned to the evaporator to complete the cycle. The combination of refrigerant and absorbing medium is commonly referred to as working fluid.

A large body of know-how, regarding apparatus and techniques for utilizing working fluids for absorption refrigeration, exists and is recorded in the literature and accordingly it will not be necessary to go into such a discussion herein. It will be apparent to anyone skilled in the art that the novel working fluids to be described herein may be adapted for use in a wide variety of absorption-type refrigeration applications and the means for carrying out such adaptations will likewise be apparent.

It is accordingly an object of this invention to provide a novel class of working fluids for absorption refrigeration systems.

It is another object of the invention to provide a novel class of working fluids for absorption refrigeration systems which are non-flammable.

Other objects and advantages of the invention will be apparent from the following description.

We have found that certain fluorine containing organic salts are particularly suited for use as working fluids for absorption refrigeration systems. These organic salts are complexes of certain perhalogenated ketones or perhalogenated acyl fluorides with inorganic ionizable salts.

The refrigerant component of the novel working fluids is the perhalogenated ketone or the perhalogenated acyl fluoride, either of which materials must have only chlorine and fluorine substitution in the molecule and, preferably, should have at least three fluorine atoms in a position alpha to the carbonyl group. We are aware of no limitations on molecular weight except that for reasons of availability and convenience the preferred carbon content of such materials is below 12 and, still preferably, from 3–6.

The inorganic ionizable salt serves as the absorbent component of the working fluid and may be described by the formula MX, wherein M may be Ag; an alkali metal, such as K, Na, Cc and Rb; or a tetraalkylammonium ion and wherein X may be F or CN.

The conditions under which the fluorine containing organic salts or complexes form are discussed in detail in co-pending commonly assigned application of Morton H. Litt et al., Serial No. 492,276, filed October 1, 1965. The reaction between the perhalogenated material and the inorganic salt will proceed at room temperature upon admixture of the reactants; however, in order to facilitate the reaction and promote high conversions, the inorganic salt is preferably used in conjunction with an organic solvent in which the complex is at least partially soluble. An example of a complex which forms readily and efficiently without the aid of a solvent is the complex of CsF with hexafluoroacetone. The solvent, if employed, should be aprotic, high boiling and polar and the quantity employed is not critical. An amount sufficient to afford an easily stirred solution or mixture of the sought-for complex should be used. Illustrative solvents which are particularly suited for use for the purpose described include the following: lower alkyl t-amides, such as dimethyl formamide; bis-2-(2-methoxyethoxy)ethyl ether; 1-methyl-2-pyrollidinone; sulfolanes, such as 2-methyl-sulfolane and 3-methyl-sulfolane; lower alkyl nitriles, such as acetonitrile and butyronitrile; sulfones, such as methyl ethyl sulfone and other substances, such as nitrobenzene. Other suitable solvents will occur to those of ordinary skill in the art. The preferred solvents are dimethyl formamide and bis-2-(2-methoxyethoxy)ethyl ether.

Illustrative refrigerant/absorbent combinations within the scope of the invention which have been found to be particularly useful are shown in the following table:

TABLE I

| Refrigerant: | Absorbent |
|---|---|
| Hexafluoroacetone | KF |
| Monochloropentafluoroacetone | CsF |
| Sym-dichlorotetrafluoroacetone | CsF |
| 1,1,2-trichlorotrifluoroacetone | CsF |
| Perfluorocyclopentanone | KF |
| Do | CsF |
| Do | KF |
| Do | CsF |
| Perfluoropropionyl fluoride | CsF |
| Carbonyl fluoride | CsF |
| Hexafluoroacetone | NaCN |
| Do | CsCN |
| Monochloropentafluoroacetone | NaCN |
| Do | CsCN |
| Sym-dichlorotetrafluoroacetone | CsCN |
| 1,1,2-trichlorotrifluoroacetone | CsCN |
| Sym-dichlorotetrafluoroacetone | RbCN |
| 1,1,2-trichlorotrifluoroacetone | RbCN |
| Sym-dichlorotetrafluoroacetone | KCN |
| 1,1,2-trichlorotrifluoroacetone | KCN |
| Perfluoropropionyl fluoride | CsCN |
| Do | RbCN |
| Do | KCN |

Examples of other suitable refrigerant components are the following: perfluorobutanone, α-chloroperfluorobutanone, perfluoro-3-pentanone, 2-trifluoromethyl-3-perfluoropentanone, dodecafluoro-3-hexanone, tetradecafluoro-3-heptanone, perfluoro-6-undecanone, trifluoroacetyl fluoride, chlorodifluoroacetyl fluoride, β-chlorotetrafluoropropionyl fluoride; perfluorobutyryl fluoride, perfluoropentanoyl fluoride, perfluorohexanoyl fluoride, perfluoroheptanoyl fluoride, perfluorooctanoyl fluoride and perfluoroundecanoyl fluoride. The preferred refrigerants are those which have boiling points below about 100° C. and still preferably below about 25° C. Examples of other suitable absorbent components are AgF, AgCN, NaF, RbF and $(CH_3CH_2)_4NF$. The preferred absorbents are those which have boiling points above about 100° C. and still preferably above about 200° C.

Due to the advantageous combination of low refrigerant boiling point and high absorbent boiling point, the preferred working fluids of the invention are those comprising perhalogenated acetones as refrigerants and alkali metal fluorides as absorbents. The preferred working fluid comprises hexafluoroacetone and potassium fluoride.

The formation and decomposition of the working fluid complexes are completely reversible under the appropriate conditions. These reactions are illustrated with a specific example by the following equation:

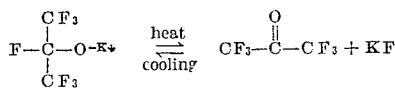

In an actual absorption cycle, the vapor formed by the refrigerant gas in an evaporator may be contacted with the ionizable salt (which salt is preferably in solution with a suitable solvent as described above), in an absorber section at ambient temperature. The pressure will build up in this absorber section until the complex equilibrium pressure is reached, at which time the complex is formed, thus effectively removing the refrigerant vapor. This process will maintain the pressure at a constant level as long as there is absorbent available. The complex may be completely in solution if sufficient solvent is employed or it may be a slurry, but in any event is pumped to a decomposition chamber wherein it is heated to decompose the same, thereby regenerating absorbent and refrigerant. In the decomposition chamber, as the temperature of the system rises, the equilibrium pressure rises. When the equilibrium pressure reaches the saturation pressure of the refrigerant gas at the condensing temperature, the complex will decompose releasing the refrigerant in gaseous form in order to maintain the pressure in the system. This process will continue as long as any complex is present in the decomposition chamber. The released refrigerant gas is condensed at a saturation pressure $P_2$, which is less than the vapor pressure $P_1$ in the decomposition chamber (or generator). The pressure $P_3$ of the spent refrigerant in the evaporator is greater than the vapor pressure $P_4$ of the solution in the absorber. These pressure relationships supply the driving force which causes the system to operate in the desired direction. The released absorbent-solvent solution is returned to the absorber for reuse. From the condenser, the liquid refrigerant is drawn off to a receiver and is released from there via an expansion valve to the evaporator thus completing the cycle.

Due to the fact that the complexes decompose in the presence of water, it is desirable that the system be essentially anhydrous.

The following illustrates practice of the invention.

*Example*

In an illustrative cycle, the hexafluoroacetone is employed as refrigerant and KF is employed as absorbent. In an evaporator, at 60 p.s.i.a. and 10° C., hexafluoroacetone is boiled, thereby absorbing heat from the area to be cooled. The vapors generated by the boiling are then led to an absorber where they are contacted with KF which is in solution, in a 1:1 mole ratio, with bis-2-(2-methoxyethoxy)ethyl ether. The absorber conditions are 50 p.s.i.a. and 35° C. The absorber temperature is maintained by external circulation of water to dissipate the heat of formation of the complex. Under these conditions, the complex of KF with hexafluoroacetone

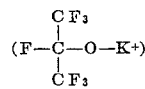

forms in the absorber and goes substantially into solution in the ether solvent. The resulting solution is pumped to a decomposition chamber wherein it is heated to between 110–130° C. at a pressure of about 140–200 p.s.i.a. The complex decomposes to form gaseous hexafluoroacetone and a solution of KF salt in the ether solvent. The KF solution is returned to the absorber and the gaseous hexafluoroacetone is liquefied in a condenser at 27° C. and 105 p.s.i.a. and returned to the evaporator via a receiver, thus completing the cycle.

Other working fluids within the scope of the invention behave in the same manner in the system described.

It will be apparent to one skilled in this art that a wide variety of applications of the novel working fluids may be made and that modifications and variations may be made without departing from the scope and the spirit of the invention. For example, there may be incorporated in the working fluids various additives, such as solubilizing agents, lubricants, stabilizers, etc.

The invention is thus not to be limited by any specific illustration made herein but only by the scope of the appended claims.

We claim:
1. The method of absorption refrigeration comprising the steps of:
   (a) evaporating, in the vicinity of a body to be cooled, a refrigerant comprising a member selected from the group consisting of a perhalogenated ketone and a perhalogenated acyl fluoride, which perhalogenated ketone and perhalogenated acyl fluoride contain only fluorine and chlorine as halogen substitution,
   (b) bringing the evaporated refrigerant vapors in contact with an ionizable salt having the formula MX, in which M is Ag, an alkali metal, or a tetraalkylammonium ion and X is F or CN, under conditions operative to form a heat decomposable complex between the refrigerant component and the absorbent component,
   (c) heating the complex to decompose the same into absorbent and gaseous refrigerant,
   (d) condensing the refrigerant gas and
   (e) returning the refrigerant in liquid form to the vicinity of the body to be cooled for reevaporation and recycling.

2. The process according to claim 1 in which the evaporated refrigerant vapors are brought into contact with the ionizable salt in the presence of an aprotic, polar, high-boiling organic solvent.

3. The process according to claim 2 in which the perhalogenated ketone or perhalogenated acyl fluoride possesses at least three fluorine atoms in a position alpha to the carbonyl group.

4. The process according to claim 2 in which the refrigerant component has a boiling point below about 100° C.

5. The process according to claim 2 in which the refrigerant has a boiling point below about 25° C.

6. The process according to claim 2 in which the boiling point of the ionizable salt is above about 200° C.

7. The process according to claim 2 in which the refrigerant is a perhalogenated acetone and in which the absorbent is an alkali metal fluoride.

8. The process according to claim 2 in which the solvent is a member selected from the group consisting of lower alkyl t-amides; sulfolanes; lower alkyl nitriles; sulfones; bis-2-(2-methoxyethoxy)ethyl ether; 1-methyl-2-pyrollidinone and nitrobenzene.

9. The process according to claim 2 in which the refrigerant is hexafluoroacetone, the absorbent is KF and in whic hthe solvent is a member selected from the group consisting of dimethyl formamide and bis-2-(2-methoxyethoxy)ethyl ether.

References Cited by the Examiner

UNITED STATES PATENTS

| | | | |
|---|---|---|---|
| 2,998,388 | 8/1961 | La Lande | 62—114 |
| 3,019,614 | 2/1962 | Schubert et al. | 62—114 |
| 3,183,680 | 5/1965 | Billi | 62—112 |

LLOYD L. KING, *Primary Examiner.*